(12) United States Patent
Shantz et al.

(10) Patent No.: US 10,675,799 B2
(45) Date of Patent: Jun. 9, 2020

(54) INJECTION UNIT POSITIONING APPARATUS

(71) Applicant: Mold-Masters (2007) Limited, Georgetown (CA)

(72) Inventors: David Allan Shantz, Milton (CA); Martin Kestle, Everett (CA); Alexander Berlin, Mississauga (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 13 days.

(21) Appl. No.: 15/774,008

(22) PCT Filed: Nov. 7, 2016

(86) PCT No.: PCT/CA2016/051293
§ 371 (c)(1),
(2) Date: May 6, 2018

(87) PCT Pub. No.: WO2017/075720
PCT Pub. Date: May 11, 2017

(65) Prior Publication Data
US 2018/0326631 A1    Nov. 15, 2018

Related U.S. Application Data

(60) Provisional application No. 62/252,196, filed on Nov. 6, 2015.

(51) Int. Cl.
| | | |
|---|---|---|
| *B29C 45/17* | (2006.01) | |
| *B29C 45/07* | (2006.01) | |
| *B29C 45/50* | (2006.01) | |

(52) U.S. Cl.
CPC .......... *B29C 45/1773* (2013.01); *B29C 45/07* (2013.01); *B29C 45/1761* (2013.01); *B29C 45/5008* (2013.01)

(58) Field of Classification Search
CPC ... B29C 64/241; B29C 45/17; B29C 45/1761; B29C 45/1773
(Continued)

(56) References Cited

U.S. PATENT DOCUMENTS

| | | | |
|---|---|---|---|
| 3,086,244 | A | 4/1963 | Hehl |
| 3,205,536 | A | 9/1965 | Funck |

(Continued)

FOREIGN PATENT DOCUMENTS

| | | |
|---|---|---|
| CN | 2633554 Y | 8/2004 |
| CN | 2671789 Y | 1/2005 |

(Continued)

*Primary Examiner* — Leith S Shafi
*Assistant Examiner* — Nicholas J Chidiac
(74) *Attorney, Agent, or Firm* — Medler Ferro Woodhouse & Mills PLLC

(57) ABSTRACT

An apparatus for aligning an outlet of an injection unit with an inlet of a mold mounted between platens of a molding machine includes a positioning assembly interconnecting the injection unit to the molding machine. The positioning assembly includes a first translation assembly configured to engender a first movement of the injection unit outlet along a translation plane, and a second translation assembly configured to engender a second movement of the injection unit outlet along the translation plane. The positioning assembly further includes a brake assembly extending between the first translation assembly and the second translation assembly. The brake assembly is configured to selectively create a compressive force between the first and second translation assemblies to maintain the position of the injection unit outlet.

19 Claims, 14 Drawing Sheets

(58) Field of Classification Search
USPC .................................................. 425/574, 575
See application file for complete search history.

(56) References Cited

U.S. PATENT DOCUMENTS

| | | | |
|---|---|---|---|
| 3,335,464 A | 8/1967 | Schwartz |
| 3,464,091 A | 9/1969 | Bielfeldt |
| 3,564,658 A | 2/1971 | Hehl |
| 3,761,214 A | 9/1973 | Hehl |
| 3,909,173 A | 9/1975 | Latter |
| 4,753,589 A | 6/1988 | Hehl |
| 4,773,842 A | 9/1988 | Aoki |
| 4,863,362 A | 9/1989 | Hehl |
| 4,863,368 A | 9/1989 | Hehl |
| 4,865,534 A | 9/1989 | Hehl |
| 5,007,816 A | 4/1991 | Hehl |
| 5,183,621 A | 2/1993 | Yukihiro et al. |
| 5,219,586 A | 6/1993 | Yukihiro et al. |
| 5,360,332 A | 11/1994 | Hehl |
| 5,388,983 A | 2/1995 | Hehl |
| 5,443,378 A | 8/1995 | Jaroschek et al. |
| 5,643,520 A | 7/1997 | Carmien |
| 5,643,620 A | 7/1997 | Brun, Jr. |
| 6,352,427 B1 | 3/2002 | Hahn et al. |
| 6,447,282 B1 | 9/2002 | Miyauchi |
| 6,450,794 B1 | 9/2002 | Orru |
| 6,468,458 B1 | 10/2002 | Anderson et al. |
| 6,572,362 B2 | 6/2003 | Boyd |
| 6,994,810 B2 | 2/2006 | Hahn et al. |
| 7,393,199 B2 | 7/2008 | Hahn et al. |
| 7,399,179 B2 | 7/2008 | Schultz et al. |
| 7,484,948 B2 | 2/2009 | Wimberger |
| 7,524,184 B2 | 4/2009 | Hsu |
| 7,833,008 B2 | 11/2010 | Wimberger |
| 8,221,113 B2 | 7/2012 | Schad et al. |
| 9,248,593 B2 | 2/2016 | Kestle et al. |
| 2007/0087080 A1 | 4/2007 | Weinmann |
| 2011/0151048 A1 | 6/2011 | Schad et al. |

FOREIGN PATENT DOCUMENTS

| | | |
|---|---|---|
| CN | 201881063 U | 6/2011 |
| CN | 202144069 U | 2/2012 |
| CN | 103264474 A | 8/2013 |
| DE | 1 852 612 U | 5/1962 |
| DE | 17 53 852 A1 | 10/1975 |
| EP | 0 794 046 A2 | 9/1997 |
| EP | 1 340 607 A1 | 9/2003 |
| EP | 1 802 433 B1 | 3/2010 |
| GB | 1 316 741 A | 5/1973 |
| GB | 1 507 102 A | 4/1978 |
| JP | 7-227875 A | 8/1995 |
| WO | 99/36244 A1 | 7/1999 |
| WO | 2005/007381 A2 | 1/2005 |
| WO | WO-2014059528 A1 * | 4/2014 |

* cited by examiner

INJECTION UNIT POSITIONING APPARATUS

CROSS-REFERENCE TO RELATED APPLICATIONS

This application claims priority under 35 U.S.C. § 119(e) to U.S. Provisional Application No. 62/252,196 filed Nov. 6, 2015, the contents of which are incorporated by reference herein in their entirety.

FIELD OF THE INVENTION

The invention relates generally to injection molding machines and more particularly to an injection unit positioning apparatus for moving an outlet of an injection unit relative to an inlet of a mold.

BACKGROUND

Injection units or auxiliary injection units for injection molding machines sometimes need to be positioned at specific locations in order to align with an inlet of a mold of a molding machine. Thus, it is desirable for such an injection unit or an auxiliary injection unit to be movable in various directions to align an outlet of an extruder nozzle of the injection unit with the inlet component of the molding machine. However, while it is desirable for the injection unit to be movable, it is also desirable for the injection unit to remain stable when in use to inject molding material into the mold.

SUMMARY

Embodiments hereof are directed to an apparatus for aligning an outlet of an injection unit with an inlet of a mold mounted between platens of a molding machine. The apparatus includes a positioning assembly interconnecting the injection unit to the molding machine. The positioning assembly includes a first translation assembly configured to engender a first movement of the injection unit outlet along a translation plane, and a second translation assembly configured to engender a second movement of the injection unit outlet along the translation plane. The positioning assembly further includes a brake assembly extending between the first translation assembly and the second translation assembly. The brake assembly is configured to selectively create a compressive force between the first and second translation assemblies to maintain the position of the injection unit outlet.

DETAILED DESCRIPTION

Specific embodiments are now described with reference to the figures. The following detailed description is merely exemplary in nature and is not intended to limit the invention or the application and uses of the invention. In the following description, "downstream" is used with reference to the direction of mold material flow from an injection unit to a mold cavity of an injection molding system, and also to the order of components or features thereof through which the mold material flows from an injection unit to a mold cavity, whereas "upstream" is used with reference to the opposite direction. "Top", "bottom", "upper", "lower", and "side" are given their customary meaning and are used with reference to an injection molding machine and viewed from the operator side and with reference to the orientation of the figures as shown on their respective pages.

Furthermore, there is no intention to be bound by any expressed or implied theory presented in the preceding technical field, background, brief summary or the following detailed description.

Figure 1:
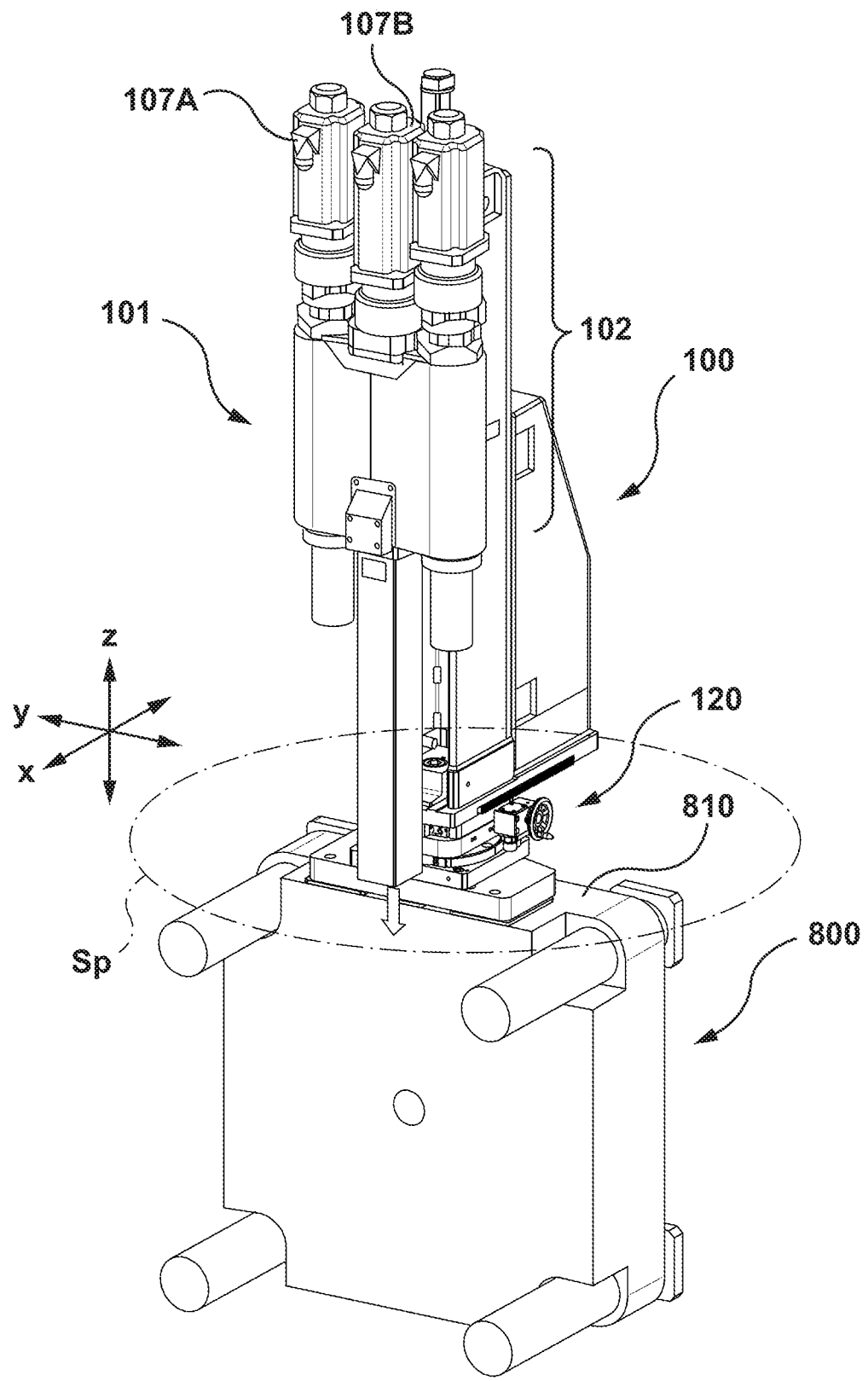
FIG. 1 is a front perspective view of an injection unit positioning apparatus having an injection unit coupled thereto and mounted to a portion of a molding machine.
Figure 2:
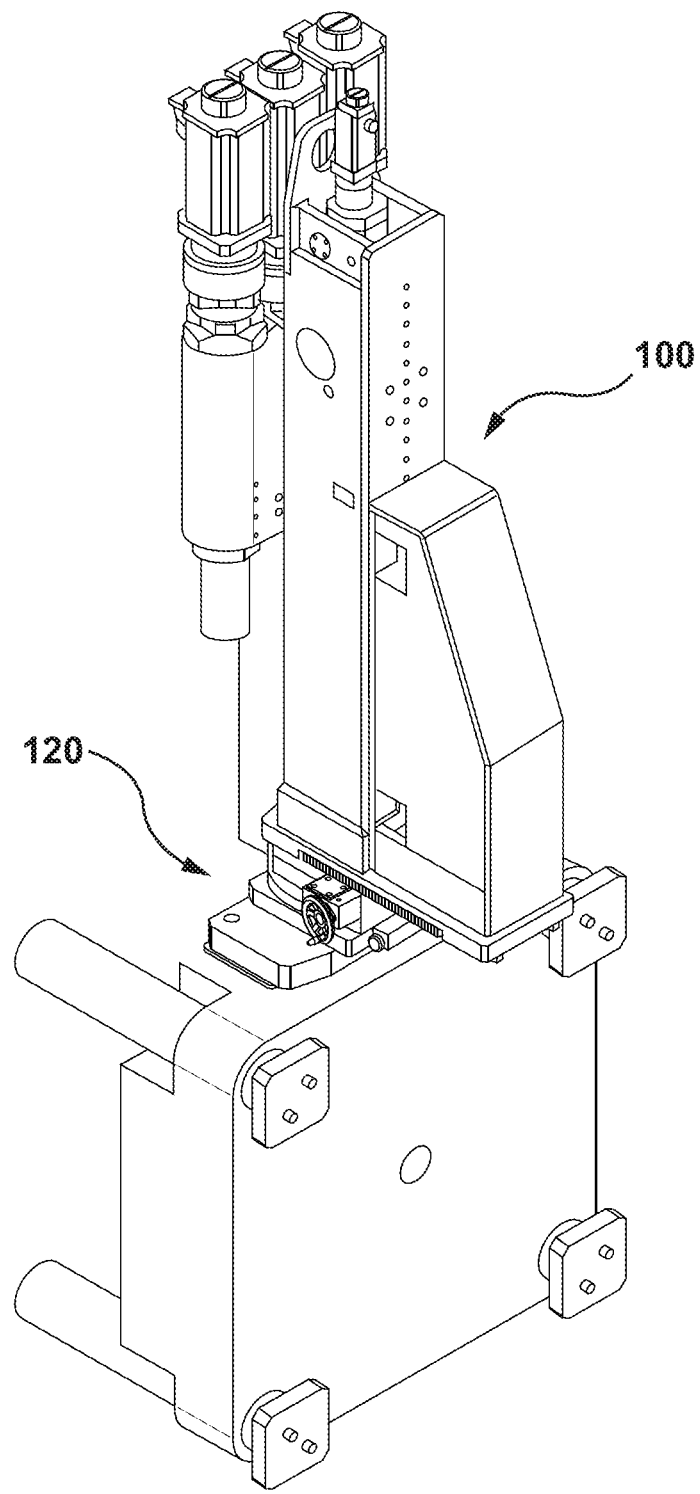
FIG. 2 is a rear perspective view of the injection unit positioning apparatus of FIG. 1 having an injection unit coupled thereto and mounted to a portion of a molding machine.
Figure 3:
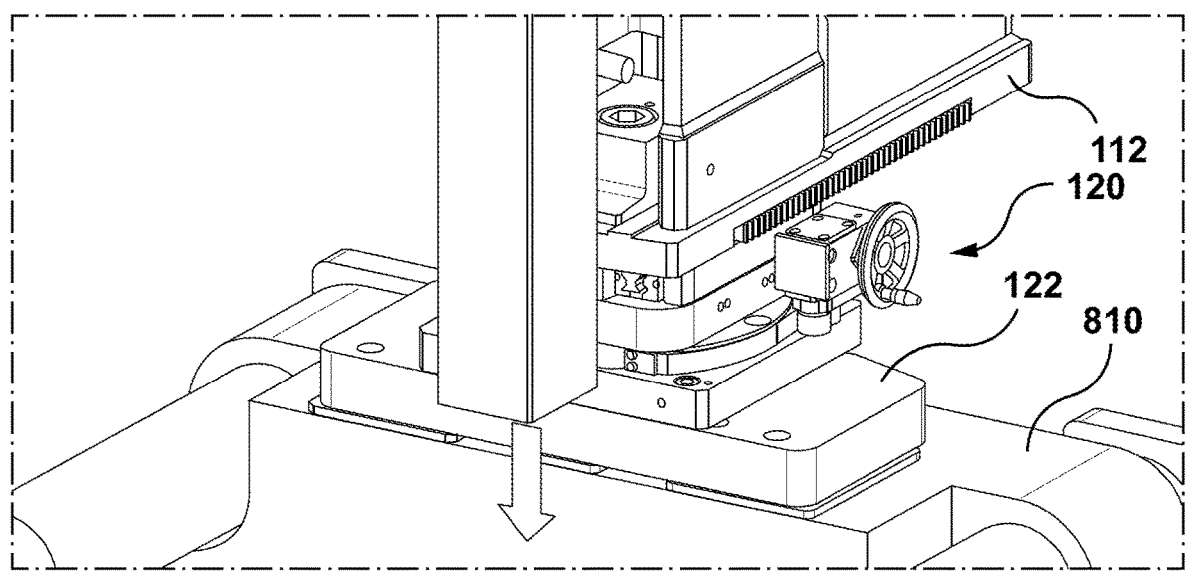
FIG. 3 is an enlarged view of a portion of FIG. 1.

FIG. 1 is a front perspective view of an injection unit positioning apparatus 100 (also referred to as a carriage assembly) in accordance with an embodiment hereof having an injection unit 101 coupled thereto. The injection unit positioning apparatus 100 is attached to a mold 800. FIG. 2 is a rear perspective view of the injection unit positioning apparatus 100 of FIG. 1. Features and aspects of the current embodiment may be used accordingly with the other embodiments.

The injection unit 101 includes a drive assembly 102 for providing linear and rotary operation to an extruder screw which is rotatably and slidably disposed within an extruder barrel 103. The injection unit 101 may also include an injection housing and a barrel housing, coupled together by a linear drive mechanism, such as a pair of ball screws extending through the injection housing and rotatably coupled to respective ball nuts located in the barrel housing. A motor, such as a servo motor 107A, is coupled to each ball screw for rotation thereof. Rotation of ball screws relative to ball nuts translates rotary motion of servo motor the 107A into linear motion of ball screws, the injection housing, and subsequently the extruder screw coupled thereto relative to the extruder barrel 103 and the barrel housing during the injection phase of the molding cycle.

The drive assembly 102 may include another motor, such as servo motor 107B, coupled to the extruder screw for rotating the extruder screw to plasticize molding material between the extruder screw and extruder barrel 103. The extruder screw may be coupled between injection housing and drive assembly 102 via a quill which permits rotation and translation movement of the extruder screw during the injection cycle.

During operation, raw polymeric pellets from an external hopper (not shown) are introduced into extruder barrel 103 via an entry chute at an upstream end of extruder barrel 103 while the extruder screw is rotated and translated upward within extruder barrel 103, which moves the pellets downstream within a bore in extruder barrel 103, and melts the pellets into a melt stream of moldable material by a combination of heat applied to extruder barrel 103 by band heaters and kneading of the polymeric pellets caused by rotation of the extruder screw.

When the required shot volume is reached, rotation of the extruder screw is halted, and it is translated in a downstream direction within extruder barrel 103 by drive assembly 102 to inject a shot of melt into an inlet of an injection mold such as an inlet of a mold, and ultimately into one or more mold cavities (not shown). The specific injection unit described herein is provided by way of example and not limitation. In an alternative embodiment the injection unit may be a hydraulic powered injection unit, and in a further embodiment the injection unit may be a so-called two stage injection unit.

The injection unit positioning apparatus 100 aligns an outlet of injection unit 101 with an inlet of the mold that is mounted between the platens of a molding machine 800. A stationary platen 810 of the molding machine 800 is shown in FIGS. 1-2. Molding machines and platen arrangements thereof are known in the art of injection molding. Therefore, only a portion of the molding machine 800 is shown, and the invention hereof is not limited to use with the molding machine shown in FIGS. 1-2. The injection unit positioning apparatus 100 interconnects the injection unit 101 to the molding machine. As shown in FIGS. 1-2, the injection unit positioning apparatus 100 is coupled to the stationary platen 810 of the molding machine 800. However, the injection unit positioning apparatus 100 may be coupled to other parts of the molding machine 800.

Referring to FIGS. 1-4, the injection unit positioning apparatus 100 includes a vertical beam assembly 110, a horizontal beam assembly 108, and a lower assembly 120. The injection unit positioning apparatus 100 interconnects the injection unit 101 to the molding machine 800, often to the stationary platen 810 of the molding machine 800. However, other mounting arrangements are contemplated.

Figure 4:
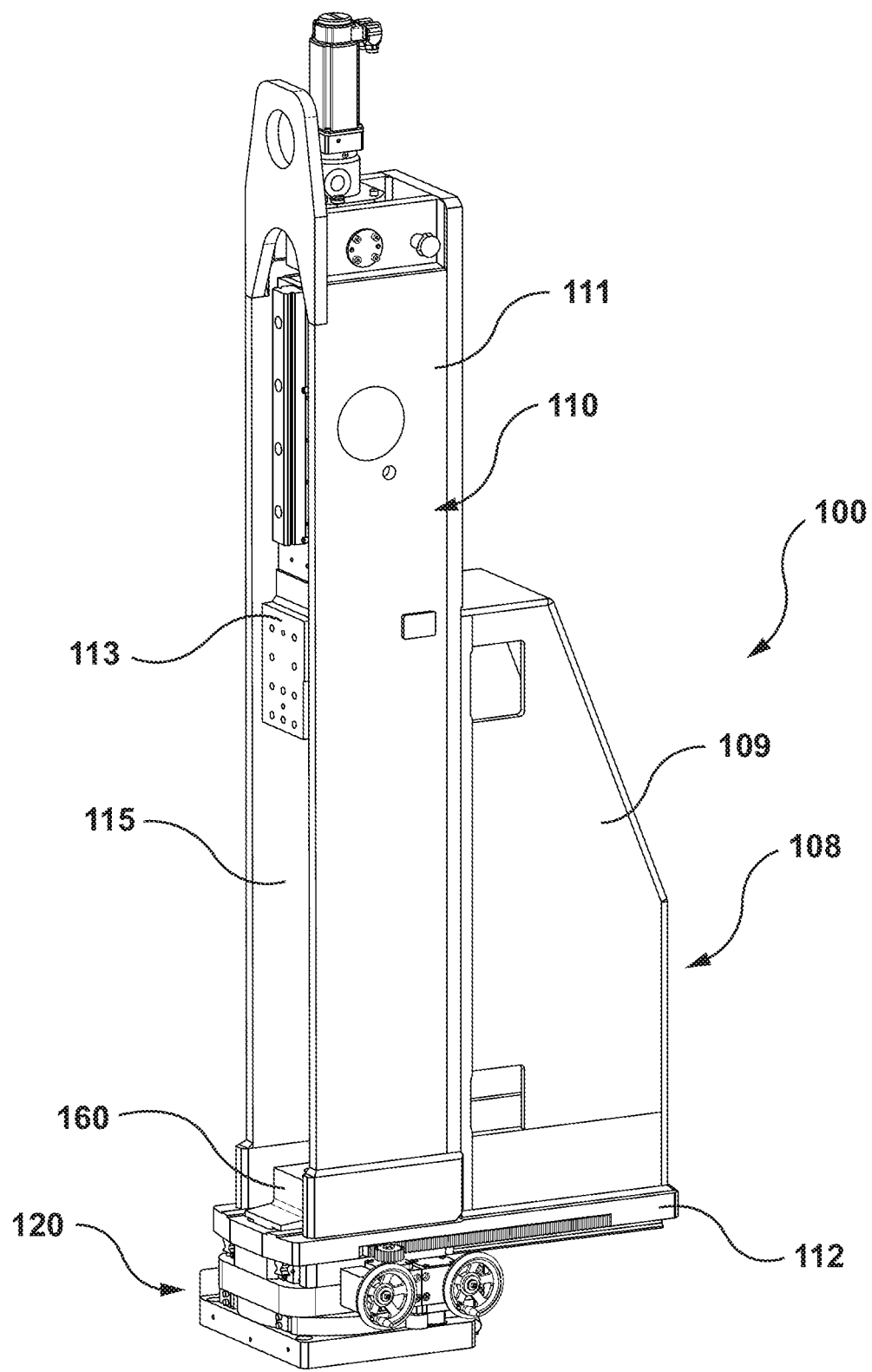
FIG. 4 is a front perspective view of the injection unit positioning apparatus of FIG. 1.

The vertical beam assembly 110 includes a vertical beam 111 and a sled beam 113 slidably coupled to the vertical beam 111. The sled beam 113 is disposed in a slot 115 of the vertical beam 111, as shown in FIG. 4. The sled beam 113 is coupled to the injection unit 101 and is configured to move the vertically with the injection unit 101. The vertical beam assembly is also coupled to the horizontal beam assembly 108.

Figure 5:
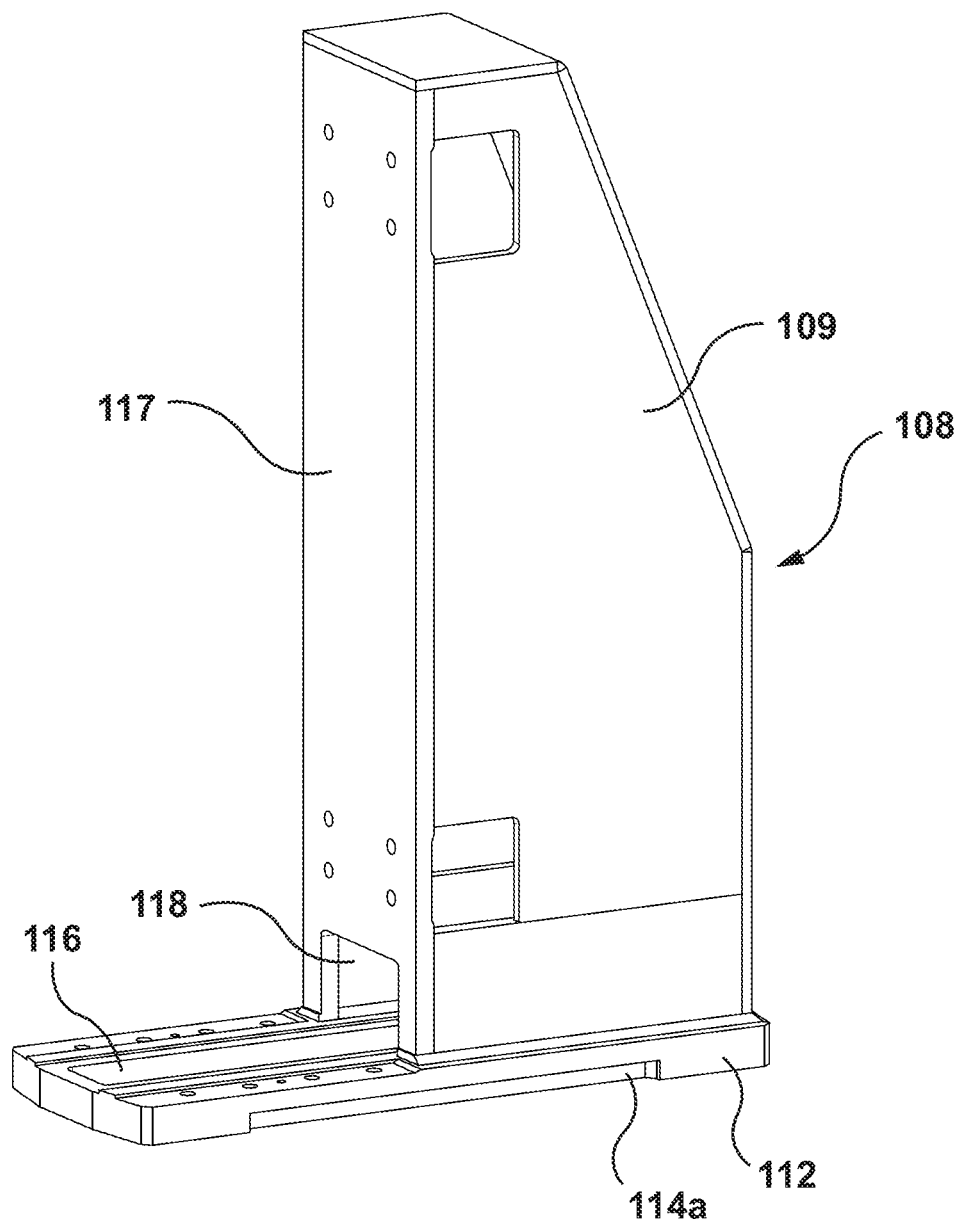
FIG. 5 is a front perspective view of a horizontal beam assembly of the injection unit positioning apparatus of FIG. 1.
Figure 6:
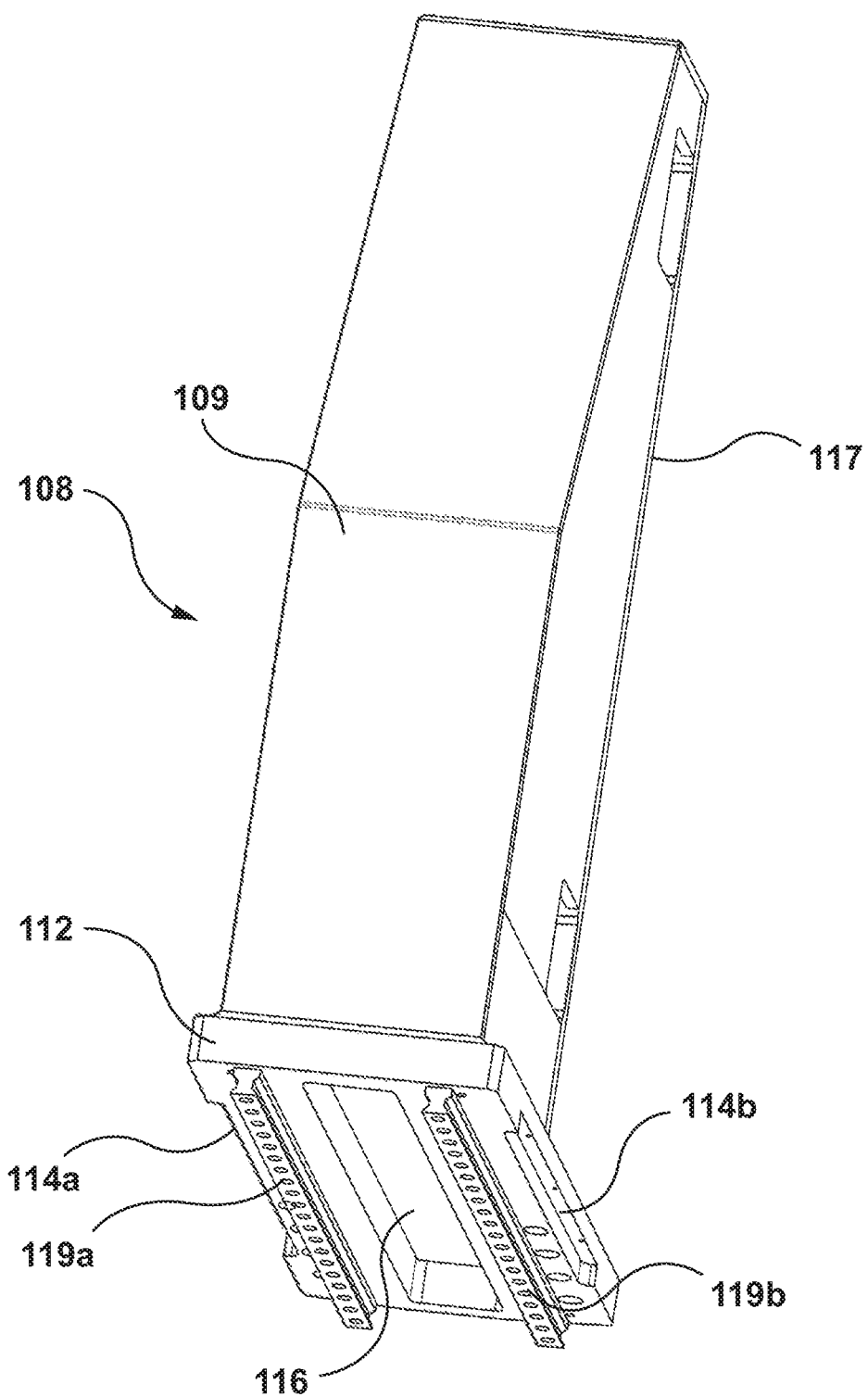
FIG. 6 is a rear, bottom perspective view of the horizontal beam assembly of FIG. 5 showing slider rails.

Referring to FIGS. 4-6, the horizontal beam assembly 108 includes a base plate 112, a vertical box 109, and a pair of rails 119a, 119b (shown in FIG. 6). The horizontal beam assembly 108 may also be referred to as a moving linear positioning assembly. The vertical box 109 includes a front surface 117 that mates with a rear surface of the vertical beam 111. The front surface 117 includes an opening 118 at an end of the front surface adjacent the base plate 112. The opening 118 leads to an interior cavity of the vertical box, which is defined by the six walls of the vertical box and an upper surface of the base plate. The vertical box 109 may be coupled to the base plate 112 by fasteners, welding, or other coupling devices suitable for the purposes described herein. The vertical box 109 may instead be formed integrally with the base plate 112. Similarly, the vertical box 109 may be coupled to the vertical beam 111 by fasteners, welding, or other coupling devices.

Referring to FIGS. 5-6, the base plate 112 is generally rectangular and includes an opening 116 disposed therethrough. The opening 116 is configured to receive a portion of the lower assembly 120, as explained in greater detail below. The opening 116 is bounded on four sides thereof by left, right, front, and rear side rails. The left and right side rails each include a groove 114a, 114b in an outer portion thereof. The groove 114a receives a rack 192 of a rack and pinion gear assembly 190, shown in FIG. 7. In the embodiment shown, fasteners 194 attached to the rack 192 extend into cavities (not shown) in the groove 114a to couple the rack 192 to the base plate 112. Therefore, when the rack 192 moves, the base plate 112 moves. The base plate 112 moves the horizontal beam assembly 108, which moves the injection unit 101. The groove 114b is optional to allow gear boxes or other components to be mounted to the opposite side of the system. Further, although a specific manner to couple the base plate 112 to rack 192 is described, it is not meant to be limiting, and other coupling methods and devices may be used.

As described above, the vertical box 109 is coupled to an upper surface of the base plate 112. As shown in FIG. 6, a pair of slide rails 119a, 119b are coupled to a lower surface of the base plate 112. The slide rails 119a, 119b are configured to be received within and slide with respect to slider guides of the lower assembly 120, as described in more detail below. The sliding movement of the slide rails 119a, 119b within the slider guides provides a linear translation movement along an X-axis for the injection unit 101 with respect to the molding machine 800, as described in more detail below.

The lower assembly 120 is attached to the molding machine 800 and is coupled to the horizontal beam assembly 108, which is coupled to the injection unit 101. The lower assembly 120 includes a first translation assembly configured to engender a first movement of the injection unit 101 along a translation plane and an angular translation assembly configured to engender an arcuate movement of the injection unit along a sweep plane. The lower assembly 120 further includes a clamp or brake assembly configured to selectively create a compressive force between the first translation assembly and the angular translation assembly to maintain the position of the injection unit outlet.

Figure 7:
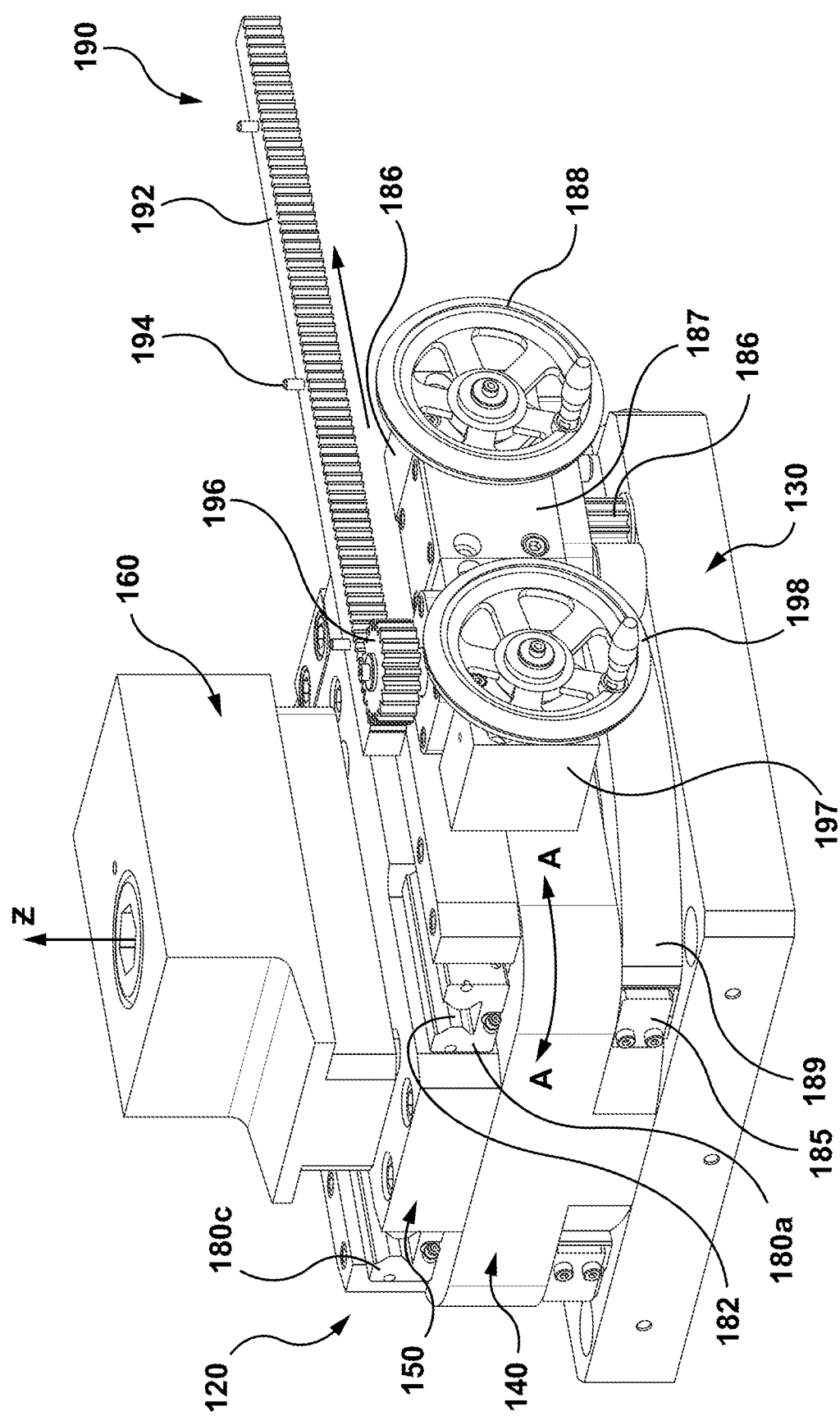
FIG. 7 is a front perspective view of a lower assembly of the injection unit positioning apparatus of FIG. 1.
Figure 8:
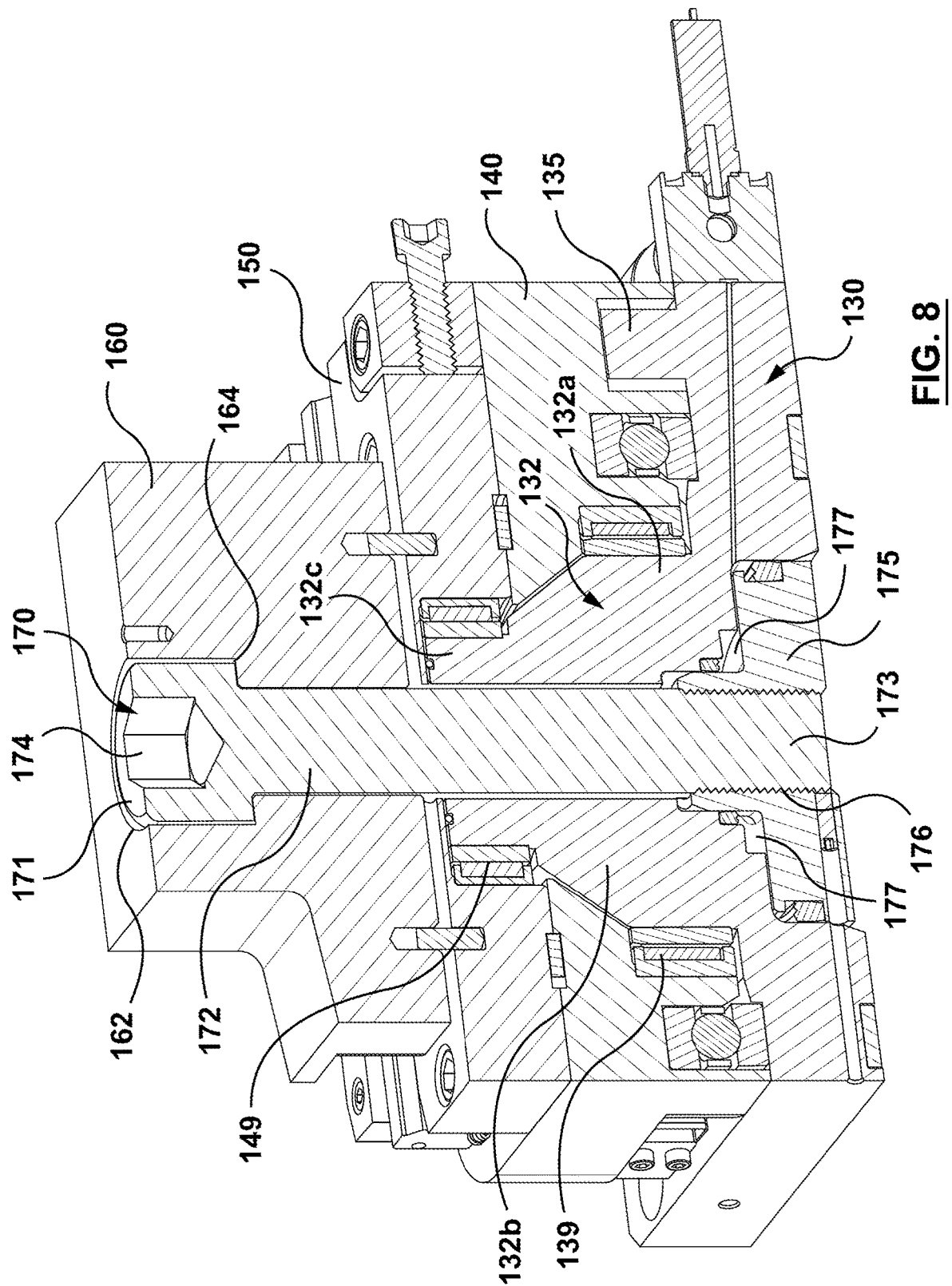
FIG. 8 is a sectional view of the lower assembly of FIG. 7.
Figure 9:
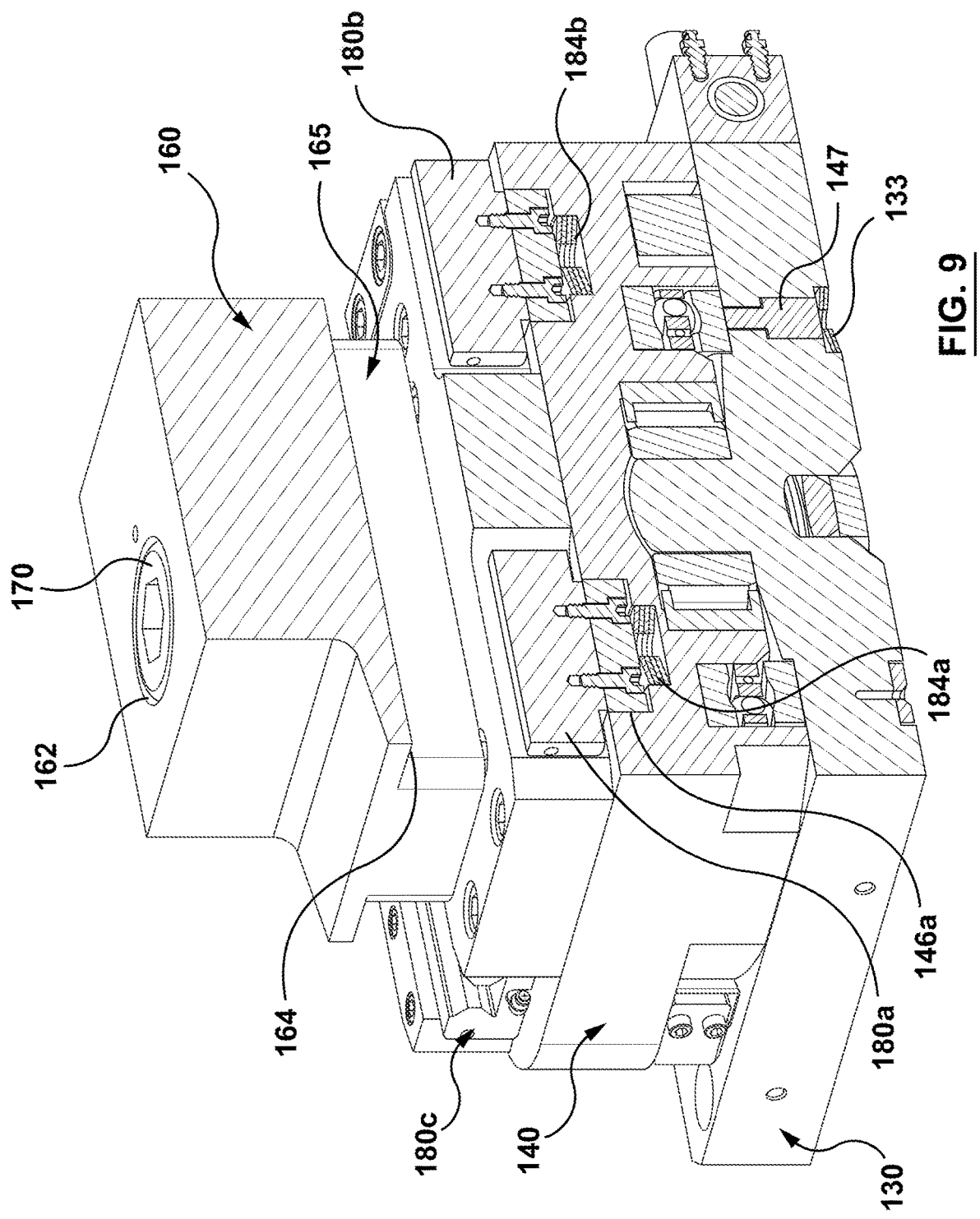
FIG. 9 is another section view of lower assembly of FIG. 7.

Referring to FIGS. 7-9, the lower assembly 120 includes a fixed positioning member 130, a movable angular positioning member 140, a bearing housing 150, a T-nut 160, slider guides 180a-180d, a fastener 170, and a piston 175. The lower assembly 120 includes other components that interact with the components noted above and thus will be described below.

Figure 10:
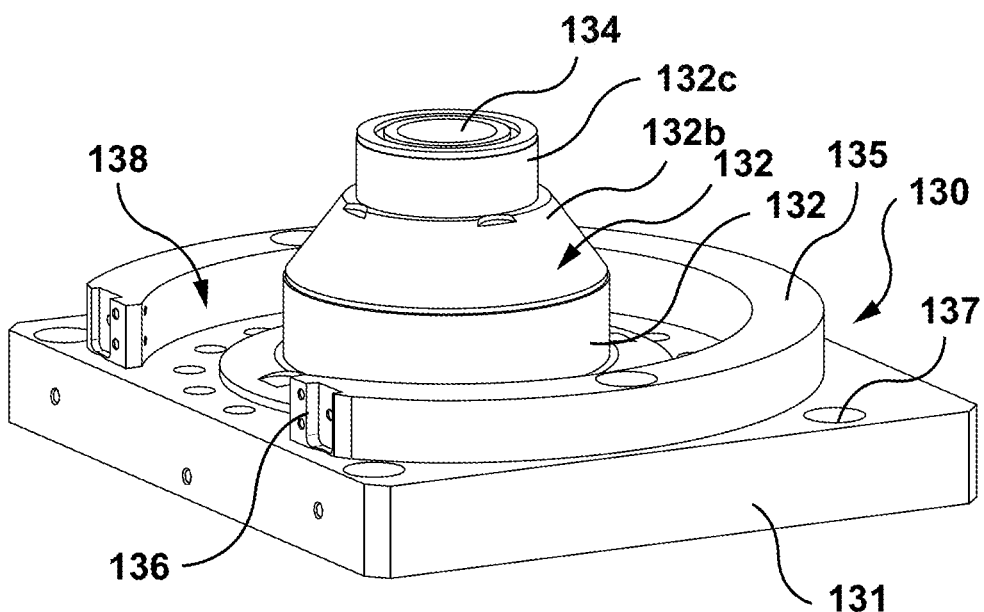
FIG. 10 is a front perspective view of a fixed positioning member of the lower assembly of FIG. 7.

Referring to FIG. 10, the fixed positioning member 130 includes a plate 131, a ring 135, and a projection 132. The ring 135 and projection 132 extend upwardly from an upper surface of the plate 131. The plate 131 is attached to a mold attachment plate 122 (FIG. 3), which attached to the molding machine 800. In the embodiment shown, the mold attachment plate 122 is attached to the stationary platen 810 of the molding machine 800. The plate 131 of the fixed positioning member 130 is attached to the mold attachment plate 122 such that the lower surface of the plate 131 faces an upper surface of the mold attachment plate 122. The plate 131 and the mold attachment plate 122 may be attached via fasteners through openings 137, or any other suitable connectors.

The projection 132 and ring 135 of the fixed positioning member 130 interact with other components of the lower assembly 120 to enable relative movement therebetween, as will be described in greater detail below. The projection 132 includes a first portion 132a extending upwardly from the upper surface of plate 131. The first portion 132a is generally cylindrical. The projection further includes a second portion 132b extending upwardly from the first portion 132a. The second portion 132b is generally frustoconical such that a diameter at an upper end of the second portion 132b is smaller than a diameter at a lower end of the second portion 132b. The diameter at the lower end of second portion 132b generally matches a diameter of the first portion 132a. Thus, the second portion 132b is generally tapered upwardly. The first and second portions 132a, 132b of the projection 132 extend through an opening in the movable angular positioning member 140 such that movable angular positioning member 140 rotates around the projection 132, as described in greater detail below. The projection 132 includes a third portion 132c extending upwardly from the second portion 132b. The third portion 132c is generally cylindrical and is generally the same diameter of the upper end of the second portion 132b. The third portion 132c extends through an opening in the bearing housing 150 such that the bearing housing 150 may rotate about the third portion 132c, as described in greater detail below. An opening 134 extends through projection 132 and plate 131 and is configured to receive a fastener of a clamping assembly, as described in greater detail below. A lower portion of the opening 134 is of a larger diameter to accommodate a piston as described in greater detail below.

The ring 135 of the fixed positioning member 130 also projects upwardly from the upper surface of the plate 131. In an embodiment, as shown in FIG. 2, the ring 135 may be generally rectangular in profile and does not form a complete ring. The ring 135 is configured to be disposed in a groove in the movable angular positioning member 140, as described in greater detail below. A first circumferential end of the ring 135 includes an attachment surface 136 for attaching an end of a timing belt, as described in greater detail below.

The fixed positioning member 130 includes a gap 138 disposed between an inner surface of the ring 135 and an outer surface of the first portion 132a of the projection 132. The gap 138 is configured to receive a portion of the movable angular positioning member 140.

Figure 11:
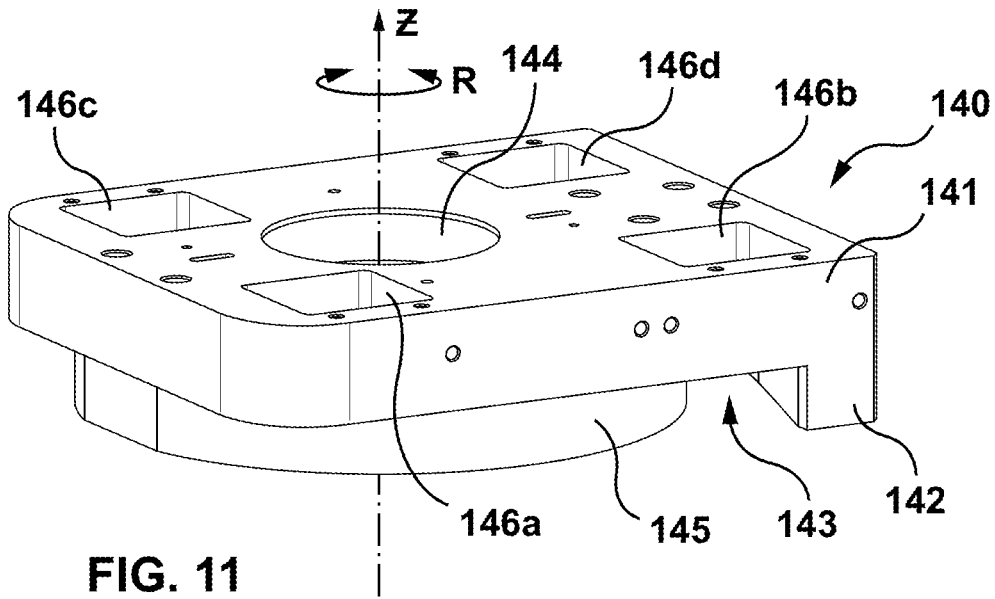
FIG. 11 is a front perspective view of a movable angular positioning member of the lower assembly of FIG. 7.

Referring to FIG. 11, the movable angular positioning member 140 is generally configured as a plate 141. The plate 141 includes a central opening 144 configured to receive the first and second portions 132a, 132b of the fixed positioning member 130 therethrough. The plate 141 further includes slider guide receiving depressions or pockets 146a-146d in an upper surface thereof. The pockets 146a-146d are configured to receive a respective one of the slider guides 180a-180d, as described in more detail below. The plate 141 further includes a lip 142 extending from a lower surface thereof. The lip 142 is configured to extend to the upper surface of the plate 131 of the fixed positioning member 130 when the movable angular positioning member 140 and the fixed position member 130 are brought together. The plate 141 further includes a central ring 145 defining a lower portion of the central opening 144. The central ring 145 is configured to receive the piston 175 therein, as described below. A gap 143 is defined between the lip 142 and the central ring 145 of the movable angular positioning member 140. The gap 143 is configured to receive the ring 135 of the fixed positioning member 130 therein, as shown in FIG. 8.

Figure 12:
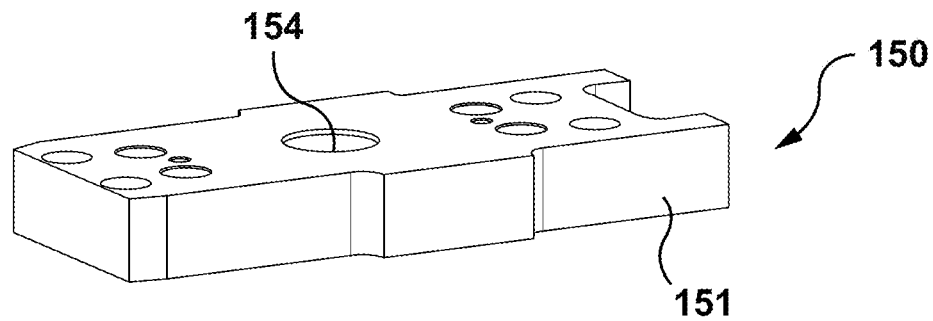
FIG. 12 is a front perspective view of bearing housing of the lower assembly of FIG. 7.

Referring to FIG. 12, the bearing housing 150 is generally a plate 151 including a central opening 154 disposed therethrough. The plate 151 is attached to the upper surface of the plate 141 of the movable angular positioning member 140. The central opening 154 is configured to receive the third portion 132c of the projection 132 of the fixed positioning member 130 therethrough. The bearing housing 150 moves with the movable angular positioning member 140. Therefore, the bearing housing 150 is configured to rotate about the projection 132.

Referring back to FIGS. 8-9, the T-nut 160 includes a central opening 162 configured to receive the fastener 170 therein. The central opening 162 includes a step 164 to accommodate the head of the fastener 170 and the shaft 172 of the fastener 170. The T-nut 160 is positioned such that the central opening 162 is aligned with the central opening 154 of the bearing housing 150. The T-nut 160 further includes lips 164 on each lateral side thereof. The lips 164 create a respective gap 165 between each lip 164 and the upper surface of the bearing housing 150, as best seen in FIG. 9. The T-nut 160 is disposed through the opening 116 in the base plate 112 of the horizontal beam assembly 108 such that the side rails of the base plate 112 are disposed in the gap 165 between the lips 164 and the upper surface of the bearing housing 150.

Referring to FIGS. 7-9, the interaction of the components of the lower assembly 120 with each other will be described. As described above, the fixed positioning member 130, the movable angular positioning member 140, the bearing housing 150, and the T-nut 160 are positioned sequentially on top of each other from the fixed positioning member 130 to the T-nut 160. As shown in FIG. 8, the fastener 170 extends through the central openings 134, 144, 154, and 162. The fastener includes a head 171 and a shaft 172. The head 171 has a larger diameter than the shaft 172. The transition or shoulder between the head 171 and the shaft 172 rests against the step 164 of the central opening 162 of the T-nut 160. The shaft 172 of the fastener 170 extends to the piston 175 disposed in the lower portion of the central opening 134 of the fixed positioning member 130. A lower portion 173 of the fastener 170 is threadably coupled to the piston 175 at a threaded engagement 176. As explained above, the movable angular positioning member 140 and the bearing housing 150 rotate around projection 132 of the fixed positioning member 130. Therefore, a first bearing 139 is disposed between an outer surface of first portion 132a of projection 130 and an inner surface of plate 141 which defines the central opening 144. Similarly, a second bearing 149 is disposed between an outer surface of the third portion 132c of the projection 132 and an inner surface of the plate 151 which defines the central opening 154. The bearings 139, 149 enable smooth rotation of the movable angular positioning member 140 and the bearing housing 150 relative to the projection 132.

The slider guides 180a-180d are disposed in respective cavities or pockets 146a-146d in the top surface of plate 141, as best seen in FIG. 9. Each slider guide 180 includes a groove 182 configured to receive a portion of a respective one of the slide rails 119a, 119b. In the embodiment shown, there are two slide rails 119a and 119b. The slide rail 119a is disposed in the grooves 182 of slider guides 180a and 180b. The slide rail 119b is disposed in the grooves 182 of slider guides 180c and 180d. The slide rails 119a, 119b can slide longitudinally with respect to the respective slider guides 180a-180d in which they are disposed. Further, although two rails and four slider guides are shown in the current embodiment, this is not meant to be limiting. Fewer or additional slider guides and slide rails may be utilized in keeping with the purposes described herein. Each slider guide 180a-180d disposed in its respective pocket 146a-146d via a plurality of biasing members 184a-184d, such disk springs (see FIG. 9). The biasing members 184a-184d bias the respective slider guides 180a-180d upwardly. Although disk springs are shown and described as the biasing members 182a-184, this is not limiting. Other biasing members may be used instead of disk springs, such as but not limited to, other types of springs, hydraulic or pneumatic lifts, or other devices that can provide a biasing force to separate the parts for smooth movement therebetween.

A second plurality of biasing members 133, such as disk springs, are disposed in respective cavities in the fixed positioning member 130. The second plurality of biasing members 133 bias upward respective bearings 147 disposed in a cavity of the movable angular positioning member 140. With the bearings 147 biased upward, the bearings 147 provide an upward force against plate 141 of movable angular positioning member 140. This upward force provides separation between the upper surface of plate 131 and the lower surface of the plate 141, thereby enabling free rotation of the movable angular positioning member 140 with respect to the fixed positioning member 130. As noted above, the biasing members 133 are described as disk springs, but this is not limiting. Other biasing members may be used instead of disk springs, such as but not limited to, other types of springs, hydraulic or pneumatic lifts, or other devices that can provide a biasing force to separate the parts for smooth movement therebetween.

The rack and pinion gear assembly 190, described briefly above, includes the rack 192, a pinion gear 196, a gear box 197, and an adjustment wheel 198. The gear box 197 is coupled to the movable angular positioning member 140. The adjustment wheel 198 is coupled to the pinion gear 196 such that rotation of the adjustment wheel 198 causes the pinion gear 196 to rotate. Teeth on the pinion gear 196 engage with teeth on the rack 192. Since the pinion gear 196 cannot translate relative to the movable angular positioning member 140 by being attached thereto, the rack 192 translates due to rotation of the pinion gear 196. As described above, the rack 190 is attached to the horizontal beam assembly 108, which is coupled to the injection unit 101 through the vertical beam assembly 110. Therefore, rotation of adjustment wheel 198 causes linear translation of the injection unit 101. This linear translation is in the direction of the Y-axis if the movable angular positioning member 140 is arranged parallel to the Y-axis. When the movable angular positioning member 140 is rotated, the linear translation will be at an angle to the Y-axis, but still in the sweep plane, described below.

The injection unit 101 may also be moved arcuately in a sweep plane SP (see FIG. 1). Such arcuate movement is provided by rotational movement of the movable angular positioning member 140 in the direction of arrows A-A in FIG. 7. Referring to FIG. 7, a gear box 187 is attached to the plate 141 of movable angular positioning member 140. A second adjustment wheel 188 is coupled to a second pinion gear 186. A timing belt 189 includes teeth (not shown) that engage with teeth on the second pinion gear 186. A second end 185 of the timing belt 189 is attached to the attachment plate 136 at an end of the ring 135 of the fixed positioning member 130. In order to move the injection unit 101 angularly in the sweep plane, the second adjustment wheel 188 is rotated. Rotation of the second adjustment wheel 188 causes rotation of the second pinion gear 186. In an example, the second pinion gear 186 may be rotated to shorten the distance between the second end 185 of the timing belt 189 and the second pinion gear 186. Because the second pinion gear 186 is coupled to the gear box 187, which is coupled to the movable angular positioning member 140, the effecting shortening of the timing belt 189 "pulls" the movable angular positioning member 140 such that it rotates clockwise about the Z-axis. The movable angular positioning member 140 may be rotated counter-clockwise about the Z axis by rotating the second adjustment wheel 188 in the opposite direction.

The linear translation and arcuate movement (rotation) of the injection unit 101 via movements of the lower assembly 120 and the horizontal beam assembly 108 described above take place with a clamping or braking assembly, described below, not activated such that the first and second plurality of biasing members 146a-146d and 133 are providing an upward force against the slides 180a-180d and the movable angular positioning member 140, respectively. With the clamping assembly inactivated, the first and second pluralities of biasing members create a "floating" configuration between fixed positioning member 130, the movable angular positioning member 140, and movable linear positioning member 108 that loads bearings and guides to facilitate reduced friction movement as the positioning assembly 100 is translating and/or rotating the injection unit 101.

The clamping or braking assembly will now be described with respect to the components described above. As noted, when the injection unit 101 is in the desired location for injection, or for any other reason, it is desirable to prevent or inhibit movement of the movable linear and angular positioning members. As explained above with respect to FIG. 8, the head 171 of the fastener 170 rests against step 164 in the central opening 162 of the T-nut 160. As further explained above, the lower portion 173 of the fastener 170 is threadably engaged with the piston 175. In the example shown in FIG. 8, the piston 175 is a hydraulic piston that includes hydraulic cavities 177. A source of hydraulic fluid (not shown) is fluidly connected to the hydraulic cavities 177. When it is desired to clamp the positioning assembly 100, hydraulic fluid is added to the hydraulic cavities 177. As can be seen in FIG. 8, the hydraulic fluid pushes downwardly on an upper surface of the piston 175, thereby moving the piston 175 downwardly along the Z-axis. It is noted that although the piston assembly is described as a hydraulic piston, this is not meant to be limiting. Other types of pistons or actuators may be used instead of a hydraulic piston. For example, and not by way of limitation, pneumatic pistons, electrical actuators, and/or electromagnetic actuators may be used in keeping with the functionality of the components as described herein.

Because the piston 175 is fixedly engaged to the shaft 172 of the fastener 170, the piston 175 is also moved downwardly along the Z-axis. With this downward movement of the shaft 172, the head 171 of the fastener 170 pushes downwardly against the step 164 of the central opening 162 of the T-nut 160, thereby pushing the T-nut 160 downwardly. As explained above, the side rails of the base plate 112 of the horizontal beam assembly 108 are disposed under the lips 164 of the T-nut 160. Therefore, when the T-nut 160 is moved downwardly, the lips 164 push against the side rails of the base plate 112, thereby pushing the base plate 112 downwardly. The slide rails 119a-119b attached to the lower surface of the base plate 112 are also pushed downwardly. The slide rails 119a-119b are disposed in the slider guides 180a-180d. Thus, when the slide rails 119a-119b are pushed downwardly with the base plate 112, the slider guides 180a-180d are pushed downwardly, which compresses the first plurality of biasing members 146a-146d. When the first plurality of biasing members 146a-146d are compressed, the lower surface of the base plate 112 abuts the upper surface of the bearing housing 150. This metal-to-metal compression of the base plate 112 and the bearing housing 150 provides a friction force which inhibits linear translation of the horizontal beam assembly 108 (i.e., the movable linear positioning member).

The downward force of the T-nut 160 against the base plate 112 and against the bearing housing 150 is transmitted through the bearing housing to the movable angular positioning member 140. The downward force is transmitted from the movable angular positioning member 140 to the bearing 147, which transmits the force to the second plurality of biasing members 133, as shown in FIG. 9. The second plurality of biasing members 133 thus compress due to this downward force. Compression of the second plurality of biasing members 133 enables the movable angular positioning member 140 to move downwardly, which causes a lower surface of the plate 141 to abut against an upper surface of the plate 131 of the fixed positioning member 130. This metal-to-metal compression of the lower surface of the plate 141 against the upper surface of plate 131 provides a friction force which inhibits angular movement of the movable angular positioning member 140 relative to the fixed positioning member 130.

Thus, as described above, when the clamping assembly is activated, it fixes or holds both the angular orientation (about the Z-axis) and the linear position (in the X-direction) of the lower assembly 120 and the horizontal beam assembly 108, thereby fixing or holding both the angular orientation and the linear position of the injection unit 101.

The embodiment described above with respect to FIGS. 1-12 is an example of components that can be used to provide linear and angular movement of an injection unit and a clamping assembly to hold the injection unit in a desired position. However, the embodiment and description of the parts is not meant to be limiting, and variations and substitutions may be made in keeping with the purpose of the components described.

Figure 13:
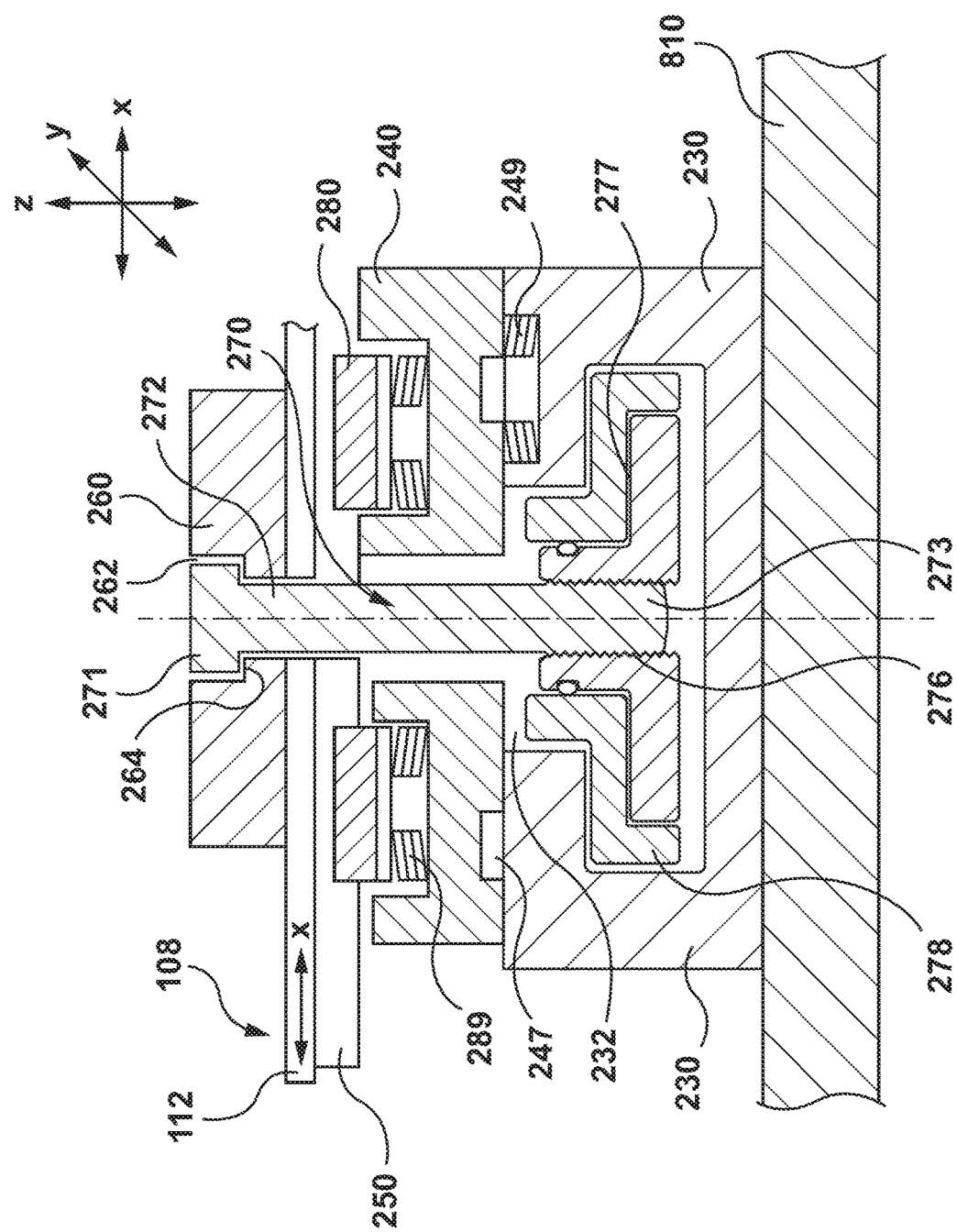
FIG. 13 is a sectional view of another embodiment of an injection unit positioning apparatus.
Figure 14:
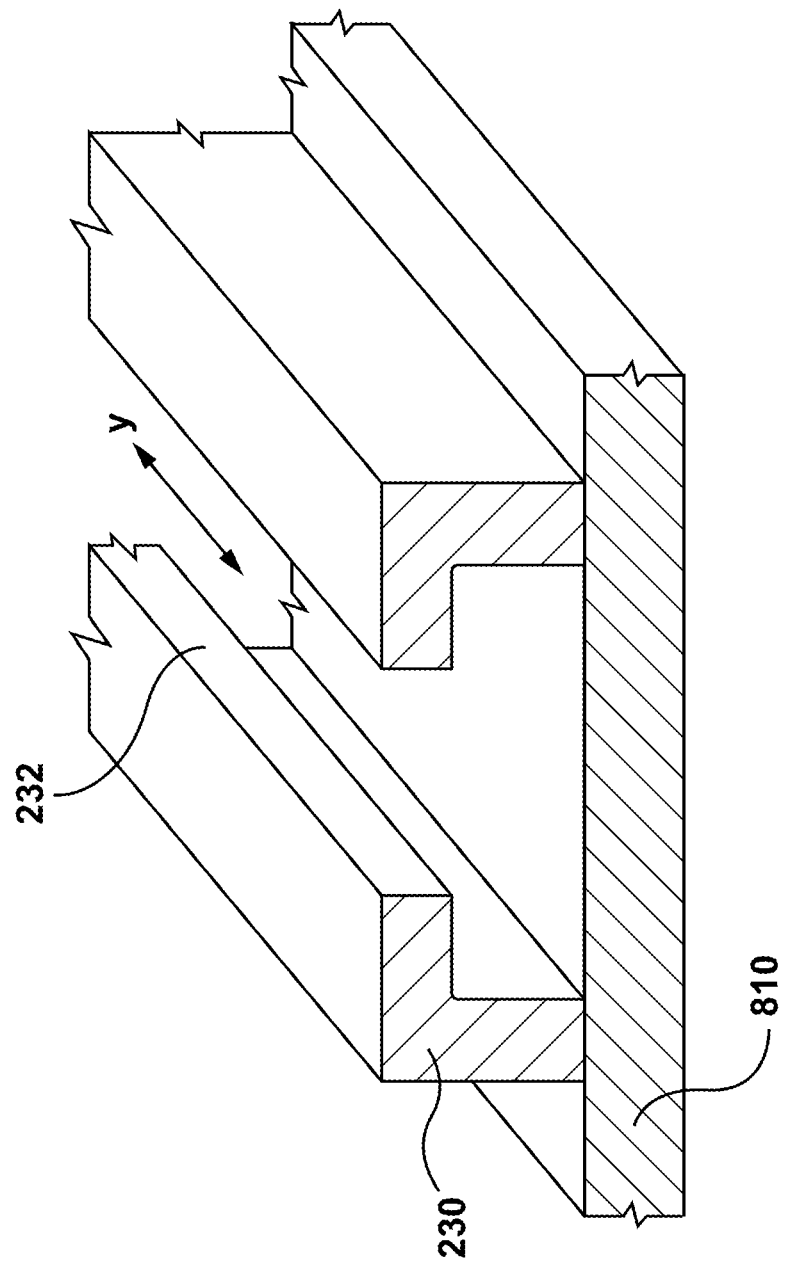
FIG. 14 is perspective view of a fixed positioning member of as lower assembly of the injection unit apparatus of FIG. 13.

FIGS. 13-14 show another embodiment of an injection unit positioning apparatus 200 which provides for linear translation in both the X and Y directions. The embodiment of FIGS. 13-14 does not provide for angular rotation about the Z-axis. A lower assembly 220 of the embodiment of FIGS. 13-14 includes a fixed positioning member 230, a first movable linear positioning member 240, a bearing housing 250, and a T-nut 260. The horizontal beam assembly 108 of the embodiment of FIGS. 1-12 is used in conjunction with the embodiment of FIGS. 13-14. The horizontal beam assembly 108 will be referred to as the second linear positioning member 108 in this embodiment.

The T-nut 260 is substantially similar to the T-nut 160. The T-nut 260 includes a central opening 262 with a step 264. The T-nut 260 includes a pair of lips (not shown) which form a gap between the lips and an upper surface of the bearing housing 250. The side rails of the base plate 112 of the second linear positioning member 108 are disposed in the respective gaps between the lips and the upper surface of the bearing housing. As in the embodiment described above, the sliding rails 119 of the base plate 112 are disposed in grooves of slider guides 280. The slider guides 280 are disposed in respective pockets 246 in an upper surface of the first movable linear positioning member 240.

The first movable linear positioning member 240 further includes a central opening 244 for accommodating a shaft 272 of a fastener 270. A lower surface of the first movable linear positioning member 240 may include anti-friction elements 247 to reduce friction between the lower surface of the first movable linear positioning member 240 and an upper surface of the fixed positioning member 230. Alternatively, or in addition, a biasing assembly 245 may be utilized to reduce friction between the lower surface of the first movable linear positioning member 240 and the upper surface of the fixed positioning member 230 to enable relative movement therebetween.

The fixed positioning member 230 is attached to the molding machine. In the embodiment shown, the fixed positioning member 230 is attached to the stationary platen 810 of the molding machine, but this embodiment is not limiting. The fixed positioning member 230 includes a T-shaped slot 232 to accommodate the fastener 270 and a piston 275. As shown in FIG. 14, the T-shaped slot 232 runs in the Y-direction such that the fastener 270 and the piston 275 may slide in the Y-direction with first movable linear positioning member 240.

A piston housing 278 is disposed within the T-shaped slot 232 of the fixed positioning member 230. The piston housing 278 protects the piston 275 from friction in the T-shaped slot 232. The piston housing 278 further provides hydraulic paths for hydraulic fluid to be delivered to hydraulic cavities 277 between the piston 275 and the piston housing 278 to operate the piston 275. Seals and other components are shown between the piston 275 and the piston housing 278 to prevent leakage of hydraulic fluid. The components are known in the art and the particular arrangement and locations shown are not limiting.

In operation, the second movable linear positioning assembly 208 operates in the same fashion as the embodiment of FIGS. 1-12. An adjustment mechanism (not shown) interacts with the base plate 112 of the second movable linear positioning assembly 108 (such as through a rack and pinion assembly) to slide the side rails of the base plate within the grooves of the slider guides 280. This movement is in the X-direction.

Further, the first linear positioning member 240 may be operated to move in the Y-direction along the slot 232 in the fixed positioning member 232. The piston 275, the fastener 270, the bearing housing 250, the T-nut 260, and the first movable linear positioning assembly 108 all move with the second movable linear member 240.

When the positioning assembly 200 is in the desired location, or for any other reason, a clamping assembly may be operated to lock the positioning assembly 200 to prevent or inhibit the translation motions described above. In particular, hydraulic fluid is provided into hydraulic cavities 277. The hydraulic fluid causes the piston 275 to move downward. Due to the connection between the piston 275 and the fastener 270, the fastener 270 is also moved downward. The downward movement of the fastener 270 creates a downward force from the head 271 of the fastener 270 on the step 264 in the central opening 262 of the T-Nut 260. This downward force is transferred to base plate 112 of the second movable linear translation member 108 via the lips of the T-nut 260, as described in the embodiment of FIGS.

1-12 above. The side rails of the base plate 108 transfer the downward force to the slide guides 280 through the slide rails 119. The slider guides 280 are disposed in the pockets 246, each of which includes a first biasing member 284. The downward force overcomes the upward force of the first biasing members 284, thereby causing the slide guides 280 to move downwardly into the pockets 246. The downward movement continues until the lower surface of the base plate 112 contacts the upper surface of the bearing housing 250. The contact between the lower surface of the base plate 112 and the upper surface of the bearing housing creates a metal-to-metal friction lock the substantially prevents the sliding movement of the second movable sliding assembly 108 relative to the lower assembly 220.

The continued downward force provided by the piston 275 and the fastener 270 is transferred to the first movable linear member 240 through the bearing housing 250 and the slider guides 280. This downward force causes the first movable linear member 240 to overcome the anti-friction elements 247 and/or the biasing assemblies 245, thereby creating a metal-to-metal friction lock between the lower surface of the first movable linear member 240 and the upper surface of the fixed positioning member 230, thereby preventing sliding movement of the first movable linear member 240 relative to the fixed positioning member 230.

Thus, as described above, when the clamping assembly is activated, it fixes or holds the linear position in both the X and Y directions of the lower assembly 220 and the horizontal beam assembly 108, thereby fixing or holding the position of the injection unit 101 in both the X and Y directions.

Figure 15:
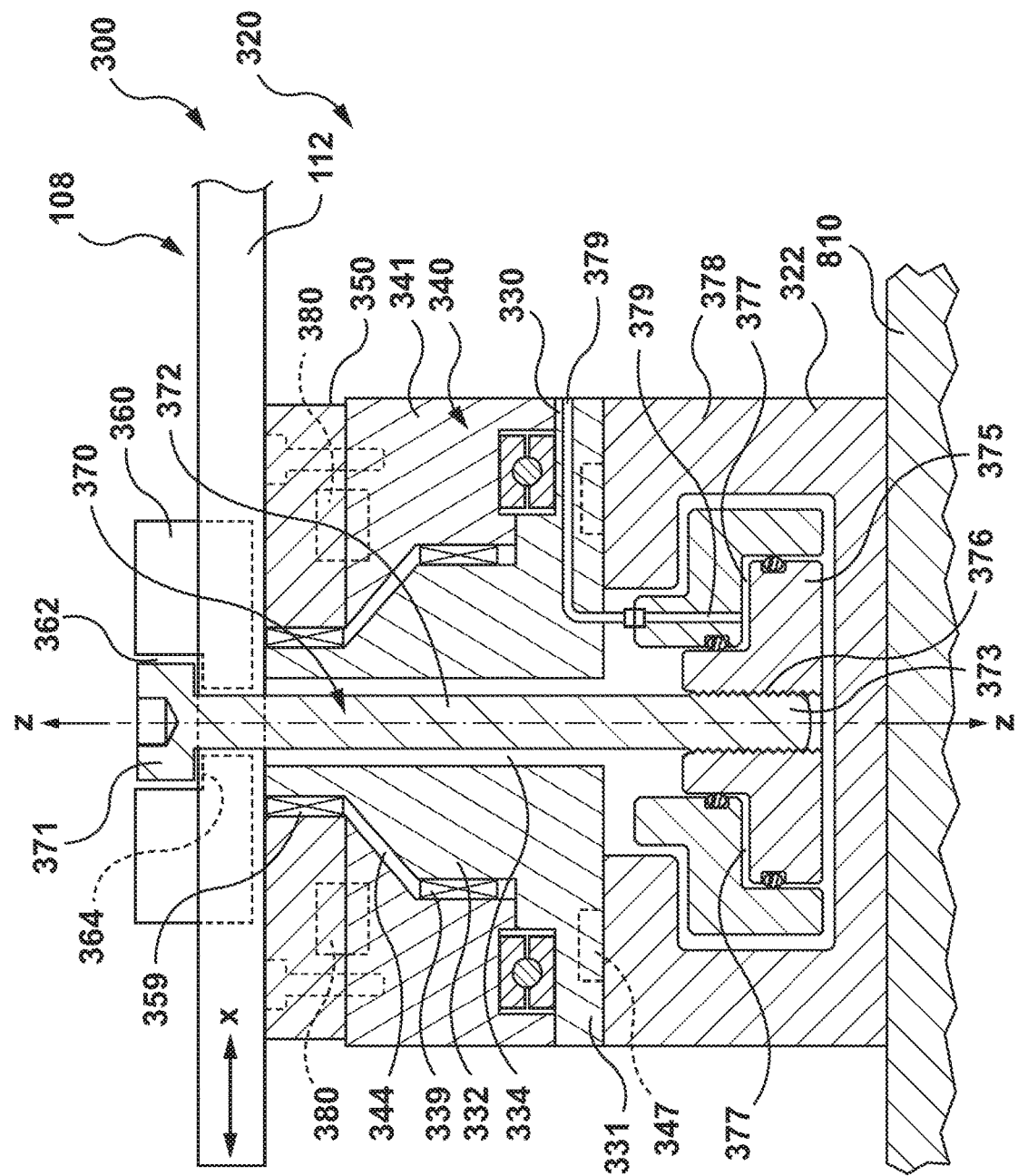
FIG. 15 is a sectional view of another embodiment of an injection unit positioning apparatus.
Figure 16:
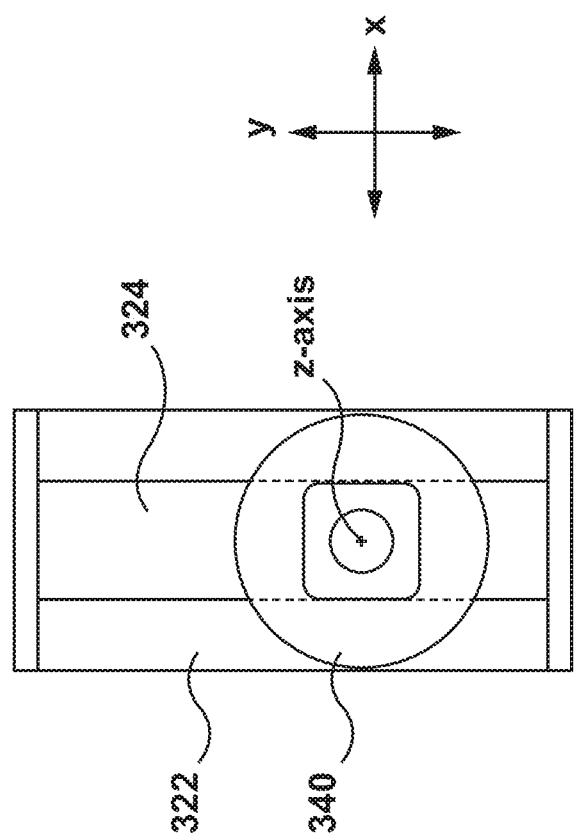
FIG. 16 is a top sectional view of a portion of the injection unit position apparatus of FIG. 15.

FIGS. 15-16 show another embodiment of a lower assembly 320 which provides for linear translation in both the X and Y directions, and angular rotation about the Z-axis. The lower assembly 320 includes a mold attachment member 322, a first movable linear positioning assembly 330, a movable angular positioning assembly 340, a bearing housing 350, a T-nut 360, a fastener 370, a piston 375, and the horizontal beam assembly 108, which is referred to in this embodiment as the second movable linear positioning assembly 108. Many details of components of the lower assembly 320 are similar to the components of the embodiment of FIGS. 1-12. Thus, details of every component may not be provided, but are the same or similar to the equivalent component in FIGS. 1-12.

The mold attachment member 322 is fixedly attached to the stationary platen 810 of a molding machine. As explained above, the mold attachment member 322 may be attached to other parts of the molding machine. The mold attachment member 322 includes a T-slot 324 running in a direction of the Y-axis, as shown in FIG. 16 (see also, FIG. 1). The T-slot 324 is sized and shaped to accommodate the piston 375 and a lower portion 373 of the fastener 370, as explained in detail below.

The first movable linear positioning assembly 330 is slidably disposed above the mold attachment member 322. The first movable linear positioning member 330 includes a plate 331, a projection 332 extending upwardly from an upper surface of the plate 331, and a central opening 334 extending through the projection 332 and the plate 331. The first movable linear positioning assembly 330 is similar to the fixed linear positioning assembly 130 of FIGS. 1-12 except that it is slidably coupled to the mold attachment member 322 instead of fixedly attached. A lower surface of the plate 331 includes anti-friction elements 337. Anti-friction elements 347 can be mechanical elements to reduce friction between the lower surface of the plate 331 and an upper surface of the mold attachment member 322, such as, but not limited to, bearings. The anti-friction elements 347 may alternatively or additionally be an anti-friction coating. The anti-friction elements 347 may be provided on the upper surface of the mold attachment member 322 instead of or in addition to the lower surface of the plate 331.

The movable angular positioning assembly 340 includes a plate 341 and a central opening 344 extending through the plate 341. The central opening 344 is shaped to accommodate the projection 332 of the first movable linear positioning assembly 330. A bearing 339 is provided between an inner surface of the central opening 344 of the movable angular positioning assembly 340 and an outer surface of the projection 332 of the first movable linear positioning assembly 330. The bearing 339 enables smooth rotation of the movable angular positioning assembly 340 relative to the projection 332.

The bearing housing 350 is generally a plate including a central opening 354 disposed therethrough. The bearing housing 350 is attached to the upper surface of the plate 341 of the moving angular positioning assembly 340. The central opening 154 is configured to receive a portion of the projection 332 of the first movable positioning assembly 330 therethrough. The bearing housing 350 moves with the moving angular positioning assembly 340. Therefore, the bearing housing 350 is configured to rotate about the projection 332. A bearing 359 is provided between an inner surface of the central opening 354 of the bearing housing 350 and an outer surface of the projection 332 of the first movable linear positioning assembly 330. The bearing 359 enables smooth rotation of the bearing housing 350 relative to the projection 332.

The T-nut 360 is substantially similar to the T-nut 360. The T-nut 360 includes a central opening 362 with a step 364. The T-nut 360 includes a pair of lips (not shown) which form a gap between the lips and an upper surface of the bearing housing 350. The side rails of the base plate 112 of the second linear positioning assembly 108 are disposed in the respective gaps between the lips and the upper surface of the bearing housing 350. As in the embodiment described above, the sliding rails 119 of the base plate 112 are disposed in grooves of slider guides 380. The slider guides 380 are disposed in respective pockets 346 in an upper surface of the plate 342 of the movable angular positioning assembly 340.

The second movable linear position assembly/horizontal beam assembly 108 of the embodiment of FIGS. 1-12 is used in conjunction with the embodiment of FIGS. 15-16. The horizontal beam assembly 108 will be referred to as the second movable linear positioning assembly 108 in this embodiment.

The piston 375 is disposed in the T-slot 324 of the mold attachment member 322. The piston 377 is threadably attached to a lower portion 373 of the fastener 370 at threaded engagement 376. Other types of attachments may be used instead of a threaded engagement. A piston housing 378 is also disposed within the T-shaped slot 324 of the mold attachment member 320. The piston housing 378 protects the piston 375 from friction in the T-shaped slot 324. The piston housing 378 further provides hydraulic paths for hydraulic fluid to be delivered to hydraulic cavities 377 between the piston 375 and the piston housing 378 to operate the piston 375. Seals and other components are shown between the piston 375 and the piston housing 378 to prevent leakage of hydraulic fluid. The components are known in the art and the particular arrangement and locations shown are not limiting. In the embodiment shown, hydraulic fluid is provide through hydraulic channels 379 in the plate 331 of the first movable linear translation assembly 330 and the piston housing 378.

In operation, the second movable linear positioning assembly 108 operates in the same fashion as the embodiment of FIGS. 1-12. An adjustment mechanism (not shown) interacts with the base plate 112 of the second movable linear positioning assembly 108 (such as through a rack and pinion assembly) to slide the side rails of the base plate within the grooves of the slider guides 380. This movement is in the X-direction.

Further, the movable angular positioning assembly 340 may be operated to rotate about the Z-axis by rotating about the projection 332 of the plate 331 of the first movable linear positioning assembly 330. The rotation of the movable angular positioning assembly 340 may be actuated, for example and not by way of limitation, by a gear and timing belt arrangement as described in the embodiment of FIGS. 1-12. However, other actuation mechanisms may also be utilized.

The first movable linear positioning assembly 330 may be operated to move in the Y-direction along the slot 324 in the mold attachment member 322. The piston 375, the fastener 370, the bearing housing 350, the T-nut 360, and the first movable linear positioning assembly 108 all move with the second movable linear positioning assembly 340.

When the positioning assembly 300 is in the desired location, or for any other reason, a clamping assembly may be operated to lock the positioning assembly 300 to prevent or inhibit the translation and rotation motions described above. In particular, hydraulic fluid is provided into the hydraulic cavities 377. The hydraulic fluid causes the piston 375 to move downward. Due to the connection between the piston 375 and the fastener 370, the fastener 370 is also moved downward. The downward movement of the fastener 370 creates a downward force from the head 371 of the fastener 370 on the step 364 in the central opening 362 of the T-Nut 360. This downward force is transferred to the base plate 112 of the second movable linear translation member 108 via the lips of the T-nut 360, as described in the embodiment of FIGS. 1-12 above. The side rails of the base plate 108 transfer the downward force to the slide guides 380 through the slide rails 119. The slider guides 380 are disposed in the pockets 346, each of which includes a first biasing member 384. The downward force overcomes the upward force of the first biasing members 384, thereby causing the slider guides 380 to move downwardly into the pockets 346. The downward movement continues until the lower surface of the base plate 112 contacts the upper surface of the bearing housing 350. The contact between the lower surface of the base plate 112 and the upper surface of the bearing housing 350 creates a metal-to-metal friction lock that substantially prevents the sliding movement of the second movable linear positioning assembly 108 relative to the lower assembly 320.

The continued downward force provided by the piston 375 and the fastener 370 is transferred to the plate 341 of the movable angular positioning assembly 340 through the bearing housing 350 and the slider guides 380. This downward force causes the movable angular positioning assembly 340 to overcome the bias of biasing elements 333, which are similar to the biasing elements 133 of the embodiment of FIGS. 1-12, thereby creating a metal-to-metal friction lock between the lower surface of the plate 341 of the movable angular positioning assembly 340 and upper surface of the plate 331 of the first movable linear positioning assembly 330, thereby preventing rotational movement of the movable angular positioning assembly 340 relative to the first movable linear positioning assembly 330.

The downward force applied from the plate 341 to the plate 331 is also applied from the lower surface of the plate 331 to the upper surface of the mold attachment member 322. This downward force causes the first movable linear assembly 330 to overcome the anti-friction elements 347, thereby creating a metal-to-metal friction lock between the lower surface of the plate 331 of the first movable linear assembly 340 and the upper surface of the mold attachment member 322, thereby preventing sliding movement of the first movable linear assembly 340 relative to the mold attachment member 322.

Thus, as described above, when the clamping assembly is activated, it fixes or holds the linear position in both the X and Y directions, and the angular position relative to the Z-axis, of the lower assembly 320 and the horizontal beam assembly 108, thereby fixing or holding the position of the injection unit 101 in both the X and Y directions, and the angular position of the injection unit 101 relative to the Z-axis.

Each component, feature, and/or variations described with respect to each embodiment described may be used interchangeably with the components, features, and/or variations described with respect to the other embodiments herein. It will be apparent to persons skilled in the relevant art that various changes in form and detail can be made therein without departing from the scope of the present invention. The scope of the claims should not be limited by the embodiments set forth in the examples, but should be given the broadest interpretation consistent with the description as a whole. Also, the term "substantially" as used herein means within normal tolerances. For example, and not by way of limitation, the term "substantially perpendicular" means within 3 degrees of perpendicular.

What is claimed is:

1. An apparatus for aligning an outlet of an injection unit with an inlet of a mold mounted between platens of a molding machine, the apparatus comprising:
  a positioning assembly interconnecting the injection unit to the molding machine, the positioning assembly including
    a first translation assembly configured to engender a first movement of the injection unit outlet along a translation plane,
    a second translation assembly configured to engender a second movement of the injection unit outlet along the translation plane, the second translation assembly including a fixed positioning member and a movable angular positioning member, the fixed positioning member including a first plate and a projection that extends upward from the first plate, and the movable angular positioning member including a second plate having a central opening configured to receive the projection such that the movable angular positioning member is rotatable around the projection, and
    a plurality of biasing members disposed between the fixed positioning member and the movable angular positioning member to provide an upward force against the movable angular positioning member, and
  a brake assembly extending between the first translation assembly and the second translation assembly, the brake assembly configured to selectively create a compressive force between the first and second translation assemblies to maintain the position of the injection unit outlet.

2. The apparatus of claim 1, further comprising a third translation assembly configured to engender a third movement of the injection unit along the translation plane, wherein the third movement is a linear translation movement that is substantially perpendicular to the first movement.

3. The apparatus of claim 1, further comprising:
a toothed ring that extends upward from the first plate; and
a gear box coupled to the movable angular positioning member, the gear box driveably engaged with the toothed ring and having an adjustment member, wherein rotation of the adjustment member causes the movable angular positioning member to rotate about the projection.

4. The apparatus of claim 1, wherein the first translation assembly includes a pair of slider guides coupled to the second plate, and a moving linear positioning assembly that includes a base plate having a pair of slide rails coupled to the base plate, the slide rails configured to be received within and slide with respect to the slider guides.

5. The apparatus of claim 4, further comprising:
a gear rack coupled to the base plate; and
a second gear box coupled to the movable angular positioning member, the second gear box driveably engaged with the gear rack and having an adjustment member, wherein rotation of the adjustment member causes the gear rack and the base plate to translate linearly.

6. The apparatus of claim 1, further comprising:
a bearing plate attached to the top surface of the movable angular positioning member, the bearing plate having a central opening configured to receive a portion of the projection.

7. The apparatus of claim 6 further comprising:
a T-nut having a lip on each of its lateral sides, the T-nut disposed through an opening in the base plate such that side rails of the base plate are between a lip on the lateral sides of the T-nut and the bearing plate.

8. The apparatus of claim 7, wherein the brake assembly includes the T-nut, a piston disposed in a central opening of the fixed positioning member, and a fastener that extends from the T-nut and is fixedly engaged with the piston.

9. The apparatus of claim 8 wherein, when the brake assembly is activated, the piston and the T-nut are moved downward and the base plate is clamped between the lips of the T-nut and the bearing plate, and the downward force of the T-nut causes a lower surface of movable angular positioning member to abut against an upper surface of the fixed positioning member.

10. The apparatus of claim 8, wherein when the brake assembly is deactivated, the biasing members between the respective slider guides and the second plate creates an upward force against the slider guides, and the plurality of biasing members between the fixed positioning member and the movable angular positioning member create an upward force against the movable angular positioning member to facilitate movement between the fixed positioning member and the movable angular positioning member, and between the movable angular positioning member and the base plate of the moving linear positioning assembly.

11. An apparatus for aligning an outlet of an injection unit with an inlet of a mold mounted between platens of a molding machine, the apparatus comprising:
a positioning assembly interconnecting the injection unit to the molding machine, the positioning assembly including
a first translation assembly configured to engender a first movement of the injection unit outlet along a translation plane, and
a second translation assembly configured to engender a second movement of the injection unit outlet along the translation plane, the second translation assembly including a fixed positioning member and a movable angular positioning member, the fixed positioning member including a first plate and a projection that extends upward from the first plate, and the movable angular positioning member including a second plate having a central opening configured to receive the projection such that the movable angular positioning member is rotatable around the projection,
wherein the first translation assembly includes a pair of slider guides coupled to the second plate, and a moving linear positioning assembly that includes a base plate having a pair of slide rails coupled to the base plate, the slide rails configured to be received within and slide with respect to the slider guides, and
a biasing member between each respective slider guide and the second plate, each biasing member biasing a respective slider guide upwardly; and
a brake assembly extending between the first translation assembly and the second translation assembly, the brake assembly configured to selectively create a compressive force between the first and second translation assemblies to maintain the position of the injection unit outlet.

12. The apparatus of claim 11, further comprising:
a plurality of biasing members disposed between the fixed positioning member and the movable angular positioning member to provide an upward force against the movable angular positioning member.

13. The apparatus of claim 11, further comprising:
a toothed ring that extends upward from the first plate; and
a gear box coupled to the movable angular positioning member, the gear box driveably engaged with the toothed ring and having an adjustment member, wherein rotation of the adjustment member causes the movable angular positioning member to rotate about the projection.

14. The apparatus of claim 11, further comprising:
a gear rack coupled to the base plate; and
a second gear box coupled to the movable angular positioning member, the second gear box driveably engaged with the gear rack and having an adjustment member, wherein rotation of the adjustment member causes the gear rack and the base plate to translate linearly.

15. The apparatus of claim 11, further comprising:
a bearing plate attached to the top surface of the movable angular positioning member, the bearing plate having a central opening configured to receive a portion of the projection.

16. The apparatus of claim 15 further comprising:
a T-nut having a lip on each of its lateral sides, the T-nut disposed through an opening in the base plate such that side rails of the base plate are between a lip on the lateral sides of the T-nut and the bearing plate.

17. The apparatus of claim 16, wherein the brake assembly includes the T-nut, a piston disposed in a central opening of the fixed positioning member, and a fastener that extends from the T-nut and is fixedly engaged with the piston.

18. The apparatus of claim 17 wherein, when the brake assembly is activated, the piston and the T-nut are moved downward and the base plate is clamped between the lips of the T-nut and the bearing plate, and the downward force of the T-nut causes a lower surface of movable angular positioning member to abut against an upper surface of the fixed positioning member.

19. The apparatus of claim 17, wherein when the brake assembly is deactivated, the biasing members between the respective slider guides and the second plate creates an upward force against the slider guides, and the plurality of biasing members between the fixed positioning member and the movable angular positioning member create an upward force against the movable angular positioning member to facilitate movement between the fixed positioning member and the movable angular positioning member, and between the movable angular positioning member and the base plate of the moving linear positioning assembly.

* * * * *